United States Patent
Rometsch et al.

(10) Patent No.: US 11,976,343 B2
(45) Date of Patent: May 7, 2024

(54) HIGH STRENGTH ALUMINIUM ALLOY FOR RAPID SOLIDIFICATION MANUFACTURING PROCESSES

(71) Applicant: MONASH UNIVERSITY, Clayton (AU)

(72) Inventors: Paul Rometsch, Clayton (AU); Xinhua Wu, Clayton (AU); Qingbo Jia, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 0 days.

(21) Appl. No.: 18/360,904

(22) Filed: Jul. 28, 2023

(65) Prior Publication Data

US 2023/0366063 A1 Nov. 16, 2023

Related U.S. Application Data

(63) Continuation of application No. 16/767,792, filed as application No. PCT/AU2018/051291 on Dec. 3, 2018, now Pat. No. 11,746,396.

(30) Foreign Application Priority Data

Dec. 4, 2017 (AU) .................................. 2017904867

(51) Int. Cl.
*C22C 1/04* (2023.01)
*B22F 3/24* (2006.01)
(Continued)

(52) U.S. Cl.
CPC .............. *C22C 1/0416* (2013.01); *B22F 3/24* (2013.01); *B22F 10/28* (2021.01); *B22F 10/64* (2021.01);
(Continued)

(58) Field of Classification Search
CPC ......... C22C 1/0416; C22C 21/00; B22F 3/24; B22F 10/28; B22F 2003/248; B33Y 70/00; C22F 1/002; C22F 1/04
(Continued)

(56) References Cited

U.S. PATENT DOCUMENTS 10,851,432 B2 12/2020 Dong et al.
2008/0029188 A1* 2/2008 Hong ...................... C22C 21/08
148/440
(Continued)

FOREIGN PATENT DOCUMENTS

CN 101100716 A 1/2008
CN 103834834 A 6/2014
(Continued)

OTHER PUBLICATIONS

International Search Report and Written Opinion dated Feb. 14, 2019 from International Application No. PCT/AU2018/051291 (Authorised officer, Alex Simmons), 9 pages.
(Continued)

*Primary Examiner* — Brian D Walck
*Assistant Examiner* — Danielle M. Carda
(74) *Attorney, Agent, or Firm* — MH2 TECHNOLOGY LAW GROUP, LLP

(57) ABSTRACT

An aluminium based alloy, and a method for production of components by additive manufacturing (AM) or other rapid solidification process with the alloy, is based on the alloy having a composition with from 2.01 wt % to 15.0 wt % manganese, from 0.3 wt % to 2.0 wt % scandium, with a balance apart from minor alloy elements and incidental impurities of aluminium.

19 Claims, 3 Drawing Sheets

Hardness results for Al-Mn-Sc based alloys after laser remelting and ageing at 300 °C.

(51) Int. Cl.
- B22F 10/28 (2021.01)
- B22F 10/64 (2021.01)
- B22F 12/20 (2021.01)
- B33Y 70/00 (2020.01)
- C22C 21/00 (2006.01)
- C22F 1/00 (2006.01)
- C22F 1/04 (2006.01)

(52) U.S. Cl.
CPC .............. *B22F 12/20* (2021.01); *B33Y 70/00* (2014.12); *C22C 21/00* (2013.01); *C22F 1/002* (2013.01); *C22F 1/04* (2013.01); *B22F 2003/248* (2013.01)

(58) Field of Classification Search
USPC .......................................................... 148/415
See application file for complete search history.

(56) References Cited

U.S. PATENT DOCUMENTS

| | | | |
|---|---|---|---|
| 2015/0027595 A1* | 1/2015 | Palm | C22F 1/02 148/552 |
| 2015/0225825 A1 | 8/2015 | Shiota et al. | |
| 2016/0145727 A1 | 5/2016 | Krishnamurthy | |
| 2017/0165795 A1 | 6/2017 | Lenczowski | |
| 2017/0314109 A1 | 11/2017 | McCloskey | |

FOREIGN PATENT DOCUMENTS

| | | |
|---|---|---|
| CN | 104342588 A | 2/2015 |
| CN | 105002425 A | 10/2015 |
| DE | 102013012259 B3 | 10/2014 |
| EP | 3181711 A1 | 6/2017 |
| EP | 3456853 A1 | 3/2019 |
| JP | 2008013826 A | 1/2008 |
| JP | 2015025202 A | 2/2015 |
| JP | 2015147980 A | 8/2015 |

OTHER PUBLICATIONS

Rowe et al., "Advance materials in automotive engineering", Woodhead Publishing Limited, 2012, Chapter 5, M. Bloeck, "Aluminium sheet for automotive applications", pp. 85-108, 92-93.

Davis et al., "Alloying: Understanding the Basics", ASM International Publishing, 2001, Chapter 16, "Aluminium and Aluminum Alloys", p. 351-416, 368.

Forbord et al., "Precipitation and recrystallisation in Al—Mn—Zr with and without Sc", Materials Science and Engineering A, 2004, vol. 387-389, pp. 936-939.

Forbord et al., "Rapid precipitation of dispersoids during extrusion of an Al-0.91 wt.% Mn-0.13 wt.% Zr-0.17 wt.% Sc-alloy", Materials Science and Engineering A, 2006, vol. 424, pp. 174-180.

Forbord et al., "Thermal stability of Al3(Scx,Zr1-x)-dispersoids in extruded aluminium alloys", Materials Science and Engineering A, 2008, vol. 475, pp. 241-248.

Li et al., "Selective laser melting of a novel Sc and Zr modified Al-6.2 Mg alloy: Processing, microstructure, and properties", Powder Technology, 2017, vol. 319, pp. 117-128.

Kranjnikov, Alexander V. et al., "Surface Characterisation of Water-Atomised Al—Zn—Mg—Cu Alloy Powders by SIMS and AES", Mikrochimica Acta., 2002, vol. 138, No. 1-2, pp. 1-12.

Morra, Valentina, Supplementary European Search Report dated Jul. 14, 2021 for corresponding European Patent Application No. 18885430, 2 pages.

\* cited by examiner

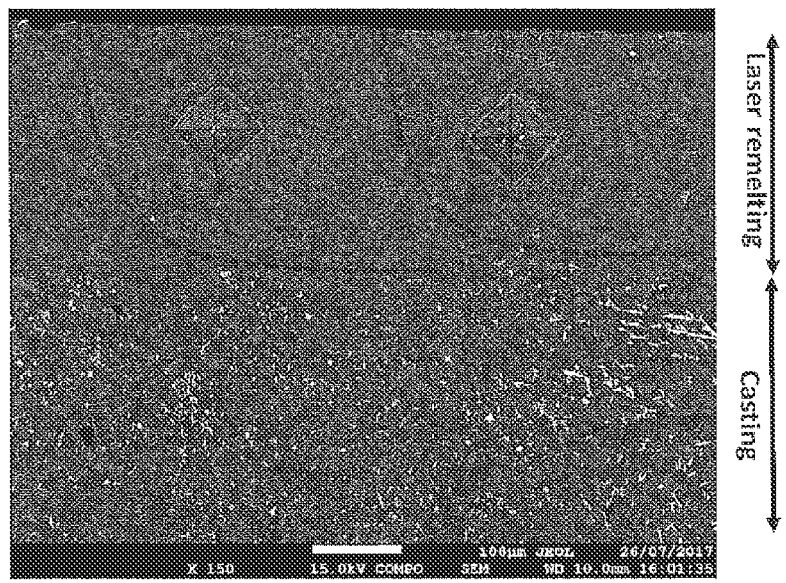
Fig.1: Hardness indentations in laser remelted Al-3Mn-1.5Mg-1Sc-0.05Zr alloy, before heat treatment, with melt pool tracks progressing in/out of the page as outlined with dashed curves.

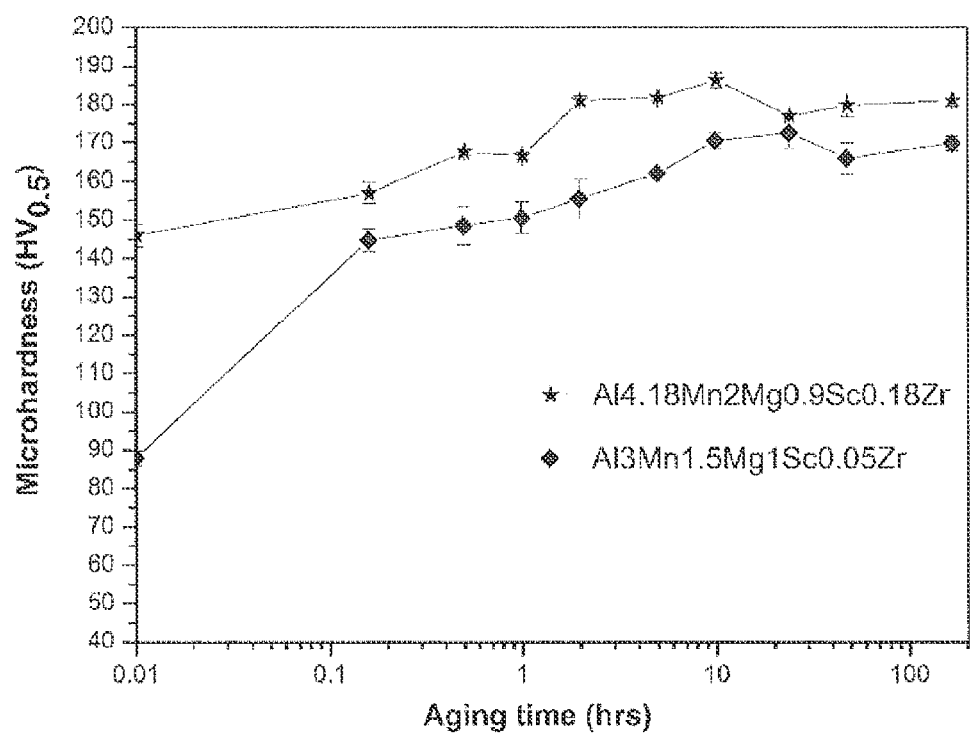
Fig.2: Hardness results for Al-Mn-Sc based alloys after laser remelting and ageing at 300 °C.

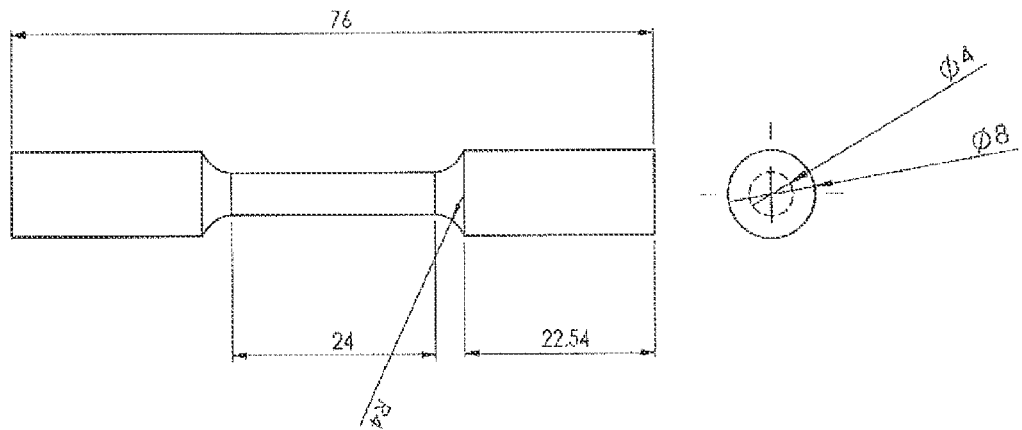
Fig.3: Schematic illustration of tensile sample geometries according to ASTM E8M.
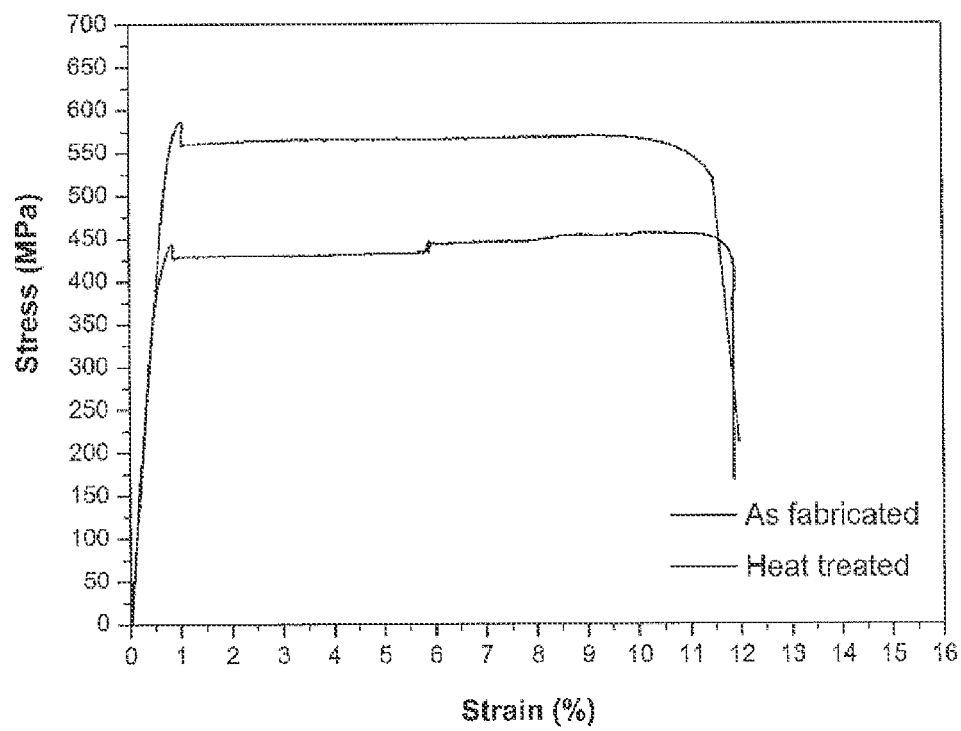
Fig.4: Engineering stress-strain curves of as SLM-fabricated and post heat treated samples.

HIGH STRENGTH ALUMINIUM ALLOY FOR RAPID SOLIDIFICATION MANUFACTURING PROCESSES

CROSS-REFERENCE TO RELATED APPLICATIONS

This application is a Continuation of U.S. application Ser. No. 16/767,792, filed 28 May 2020, which is a U.S. National Stage application of PCT/AU2018/051291, filed 3 Dec. 2018, which claims priority to Australian Application No. 2017904867 filed 4 Dec. 2017, the entire disclosures of which are hereby incorporated by reference in their entireties.

FIELD OF THE INVENTION

The present invention relates to a high strength aluminium alloy suitable for use for additive manufacturing, but also applicable to other processes, in particular to other rapid solidification manufacturing processes.

BACKGROUND TO THE INVENTION

The terminology Additive Manufacturing (AM) has become popular in recent years due to the flexibility of the process it denotes in fabricating geometrically complex parts, as well as the versatility in a number of application fields. AM technology was developed in the 1980s with the aim of directly generating parts and has developed rapidly during the intervening period. The unconventional nature of this attractive manufacturing process is that components are built additively, as opposed to traditional subtractive machining methods. Among all the developed AM technologies for metal part manufacturing, they can be broadly divided, on basis of the material feedstock types, into the non-limiting categories of powder-bed based technologies of Selective Laser Melting (SLM) and Electron Beam Melting (EBM); blown powder technologies of Laser Metal Deposition (LMD) and Laser Engineered Net Shaping (LENS); technologies by which build parts use wires, powders, "metal inks" and others as raw feedstocks. In the following, the term Additive Manufacturing (AM) will be used as a broad concept to encompassing those and other technologies. However, AM is not only limited to those technologies, while the present invention can be used not only for AM technologies but also for other rapid solidification manufacturing processes such as Laser Cladding (LC), Thermal Spray (TS), Spark Plasma Sintering (SPS), Gas Atomisation (GA) and Melt Spinning (MS).

The AM processes use a laser beam, an electron beam or an electric arc as the energy source, with the source precisely controlled by either a CNC driven system or galvanometer based mirror scanning system. Through melting and solidifying of materials, successive layers can be built up in turn by moving the energy source point by point and step by step according to respective cross-sectional forms corresponding to notional slices of a required component to be manufactured. That is, the component is built up by repeating the layer by layer process and attaining bonding between consecutive layers along a build direction.

In AM processes the melting and solidification is highly localised. As a consequence, very high cooling rates achieved within a single molten pool can be up to approximately $10^5$-$10^7$ K/s. These cooling rates are such that the manufactured components exhibit fine microstructures and resultant excellent properties, compared with components made by traditional casting processes. Together with the beneficial facts of design freedom and manufacturing flexibility offered by AM processes, there is a growing demand for critical lightweight components to be built in this manner, such as high performance aluminium alloy structural or engineering parts. Also, high performance aluminium alloys made from AM technologies that can operate at elevated temperatures (e.g. above 150° C.) are also attracting great interest in various industries as they have potential to replace some higher density titanium alloys for parts required to operate in middle-temperature regimes without losing their properties.

The selection of high performance aluminium alloys suited for AM processes is still very limited and the potential application of AM processes to the manufacture of aluminium components is restricted. Currently the widely used aluminium alloys for AM processes are near-eutectic Al—Si based alloys, such as Al7SiMg, Al12Si and Al10SiMg, due to their good castability and weldability. The reported tensile strengths of the above alloys are basically below 400 MPa and yield strengths lower than 300 MPa in the as-fabricated state and even lower after residual stress relieving treatments, due to precipitation and/or coarsening of Si-containing particles. These property levels can't meet the requirements for current industry design and application demands, especially for making critical load-bearing structural components. Also, components made from these alloys require solution treatment after fabrication to achieve the required properties, which increases both the lead time and cost for industrial production. Other high strength aluminium alloys, such as the 2xxx and 7xxx series wrought alloys that are commonly used in aerospace fields, cannot be easily fabricated by AM technologies due to their high solidification crack susceptibility during AM processing. With the presence of large amounts of copper, magnesium and zinc in such alloy systems, the solidification range is expanded, which in turn increases the hot tearing susceptibility. Additionally, there is no reported data on elevated temperature properties for aluminium alloys made by AM processes. Accordingly, the present invention seeks to provide a high strength aluminium alloy suited for use in AM processes, but also applicable to other rapid solidification manufacturing processes.

SUMMARY OF THE INVENTION

According to a first aspect of the invention there is provided an Al—Mn—Sc based alloy, wherein the Al—Mn—Sc based alloy has from 2.01 wt % to 15.0 wt % manganese, from 0.3 wt % to 2.0 wt % scandium, with a balance apart from minor alloy elements and incidental impurities of aluminium.

According to a second aspect, the invention provides a method for producing components of an aluminium based alloy, wherein the method uses an AM or other rapid solidification process to produce a component by melting and then rapidly solidifying the aluminium based alloy, and wherein the Al—Mn—Sc based alloy has from 2.01 wt % to 15.0 wt % manganese, from 0.3 wt % to 2.0 wt % scandium, with a balance apart from minor alloy elements and incidental impurities of aluminium.

In both the first and second aspect of the invention, the manganese level preferably is from 2.5 wt % and 8 wt %, and more preferably between 3 wt % and 5 wt %. The scandium level preferably is from 0.4 wt % and 1.5 wt %, and more preferably from 0.6 wt % to 1.2 wt %.

The Al—Mn—Sc based alloy of the invention, preferably in the form of a suitable grade of powder, can be used to manufacture components by additive manufacturing or other rapid solidification manufacturing processes. The components may be directly age hardened to achieve simultaneously optimised properties and elimination of residual stresses generated during the manufacturing fabrication process. The Al—Mn—Sc based alloy starting material includes higher manganese and scandium contents than in conventional aluminium alloys, and parts made from the alloy of the invention enable the provision of superior mechanical properties under both room temperature and elevated temperature conditions. The alloy of the invention, in addition to preferably being comprised of 2.01-15.0 wt % manganese and 0.3-2.0 wt % scandium, also may have further alloy constituents comprising up to 6.0 wt % magnesium, up to 4.0 wt % zirconium, other elements able to substitute for or are complementary elements to any of aluminium, manganese, scandium, magnesium and zirconium, and combinations of two or more of the further alloy constituents.

The Al—Mn—Sc based alloy of the invention can be used to directly manufacture structural components for a wide variety of industrial applications by either AM processing or by use of another rapid solidification manufacturing processes. The components manufactured from the alloy of the invention can be subjected to a simple artificial ageing treatment directly without solution treatment to achieve optimum properties. The components are able to exhibit high strength and thermal stability properties that can further enhance the application potential for AM fabricated aluminium parts.

Previously, an Al—Mn—Sc material system based on 3xxx aluminium alloys was studied by researchers for wrought/extrusion product applications mainly due to its good formability [1-3]. The purpose of adding scandium into the 3xxx wrought alloys was mainly for improving the recrystallization resistance, as well as strengthening the alloy by dispersion hardening. However, in previous studies, the amount of manganese was limited to below 2 wt % and typically below 1.5 wt %, while scandium was normally below 0.4 wt %. This is because the solubility of manganese and scandium for traditional manufacturing processes is very limited and this, in turn, restricted the resultant strengthening effect.

In contrast to this Al—Mn—Sc alloy based on the 3xxx aluminium alloy system, WO2008125092 and DE 10 2007 018 123 B4 to Palm (assignor to EADS Deutschland GmbH) proposed a method of producing a structural component by a rapid prototyping process, using an Al—Sc based alloy, such as with 0.41 wt % to 2.0 wt % scandium and from 2.0 wt % to 10 wt % magnesium. From this work has evolved an Al—Mg—Sc based alloy powder system for use in AM processes available under the trade mark SCALMALLOY®, an alloy effectively developed for AM processes by adding a percentage of scandium into an existing weldable 5xxx series wrought alloy. SCALMALLOY® sought to further strengthen the base alloy by utilising the high cooling rate advantage of AM processes. However, due to the large content of low melting point magnesium, severe evaporation and so-called smoking phenomena may occur, resulting in the formation of high porosity and subsequently causing property degradation in the final AM products. Additionally, higher magnesium contents, normally above 3 wt %, in 5xxx alloys may also cause corrosion problems, due to the intergranular attack from the precipitation of continuous β-Mg$_5$Al$_8$ phase along grain boundaries, especially when exposed to temperatures above 65° C., in particular from 150° C. to 200° C., for extended time [4]. However, at ageing temperatures above about 200° C., the β-Mg$_5$Al$_8$ phase can be dissolved and higher magnesium contents may be tolerated if application temperatures are outside the critical range of approximately 65-200° C. Nevertheless, magnesium contents above 6 wt % are not recommended as the alloy also becomes more susceptible to hot tearing [5].

The Al—Mn—Sc based alloy of the invention is not known to have been proposed or used previously for AM processes or for other rapid solidification manufacturing processes. Elimination of magnesium, or substantial reduction in the magnesium content, enables the present invention to effectively lower the risks of evaporation and resultant high porosity problems. Introducing manganese to the aluminium alloys has no known corrosion or evaporation issues during AM or other rapid solidification manufacturing processes. By virtue of the high cooling rate derived from the manufacturing process, the use of high amounts of manganese and scandium is enabled by highly improved solubility. The manganese in the alloy of the invention plays a major role in solid solution strengthening, while scandium forms thermally stable $L1_2$ structured nano-sized precipitates after post heat treatment that can strengthen the alloy significantly and maintain the advanced mechanical properties up to high temperatures. Importantly, it is to be noted that manganese has a higher solid solution strengthening effect than magnesium on a wt % basis [6]. The decomposition and formation of a high volume fraction of nano-sized Al$_3$Sc precipitates during ageing can remarkably strengthen the alloy of the invention. Al$_3$Sc precipitates have a face-centred cubic structure and maintain extremely low lattice mismatch and high coherency with the aluminium matrix, and the low diffusion rate of scandium impedes precipitate coarsening at elevated temperatures. The high mismatch strain and antiphase boundary energy of Al$_3$Sc precipitates contributes to the high strength of the alloy of the invention by pinning the grain boundaries and inhibiting dislocation movement. The alloy of the invention also has been found to demonstrate superior corrosion resistance, weldability, thermal stability and mechanical properties after AM processing or other rapid solidification processing.

The properties of the Al—Mn—Sc based alloy of the invention can be further improved by introducing other, substitutive or complementary, alloying elements to the alloy of the invention. For example, at least one of silicon, zinc, magnesium, copper, nickel, cobalt, iron, silver, chromium, lithium, vanadium, titanium, calcium, tantalum, zirconium, hafnium, yttrium, ytterbium and erbium may be added to the alloy of the invention. The benefits offered by one or more of these elements are (i) solid solution strengthening; (ii) grain refinement effect; (iii) grain structure control; (iv) further dispersion strengthening or precipitation strengthening; or (v) a combination of these benefits. Typically, the content of the above alloying elements should be less than 4 wt % individually and, at most, 15 wt % in total.

Additionally, depending on the design and application requirements, alloying elements including at least one of chromium, vanadium, titanium, tantalum, zirconium, hafnium and yttrium may be further added into the Al—Mn—Sc based alloy of the invention for improved high temperature stability. These alloying elements have an exceptionally low diffusion coefficient in aluminium, thus low diffusion rates and high particle coarsening resistance are expected at elevated temperatures. These alloying elements also have a high tendency to segregate and surround the Al$_3$Sc precipitates to form a protective shell that can stabilize the Al$_3$Sc precipitates from coarsening during exposure at elevated temperatures. Typically, the content of the above alloying elements also should be less than 4 wt % individually and, at most, 15 wt % in total.

The Al—Mn—Sc based alloy of the invention may be used for manufacture of mechanical device components, and also as a base material for manufacturing composites admixtures of metallic or non-metallic materials through either in-situ or ex-situ reactions. In addition to fabricating components from the Al—Mn—Sc based alloy of the invention as a starting material, the alloy of the invention can be made into semi-finished products like powders, wires and other forms for other production purposes.

For melting the starting raw materials, any possible energy source or combination of sources can be used, such as lasers, electron beam sources, plasmas, and electric arc sources, or suitable chemical reaction, or conductive or inductive process associated with rapid solidification technologies. The cooling rate within the manufacturing process should be such as to achieve a supersaturated solid solution for the main elements in order to maintain the properties of the fabricated components. The preferred cooling rate within the manufacturing process chain is in excess of 100 K/s. The cooling nature within the process can be directly from the manufacturing process itself, as in AM technologies or from other subsidiary processes like using water, liquid nitrogen or any other suitable cooling medium.

To achieve the optimum properties and also release residual stress generated in manufactured components produced by the AM process or other rapid solidification process, post heat treatment is normally required. The invention includes a post-heat treatment after SLM in which a component manufactured by the AM process, using the Al—Mn—Sc based alloy of the invention is subjected to heating, preferably in a single heat treatment process, to a temperature range between 200° C. and 500° C. for an accumulated time of between 0.10 h and 100 h. However, heat treatments with similar temperature-corrected times, multistep treatments or treatments under special environments are also applicable. This can include hot isostatic pressing (HIP) under appropriate pressure. A direct ageing treatment by simple direct ageing treatment without a separate solution treatment is most preferred, with this being another point of difference from other age hardening systems. After the heat treatment, no necessary limitations need to be applied to subsequent cooling and cooling controls, and cooling may range from slow furnace cooling to a rapid water quench cooling. The residual stresses generated due to high cooling rates during the AM manufacturing process can effectively be released by the heat treatment. Also, decomposition of the supersaturated solid solution resulting from the high cooling rates generates precipitation of a large volume fraction of nano-sized particles or other dispersions, thereby greatly improving mechanical properties of the components produced by the AM process.

For the AM manufacturing process, using the Al—Mn—Sc based alloy of the invention, some other beneficial control aspects are preferred. For example, by carefully adjusting the parameters (such as the laser type, laser parameters, scan strategy, substrate temperature, etc) in the AM technologies to maintain a suitable cooling rate and better processability, using protective gas environments to protect the fabricated parts from oxidation, removing the so-called smoke or spatter occurring during the AM process, or any other necessary controls for AM techniques and other rapid solidification techniques are expected to further improve the properties of the fabricated products.

Examples of the Invention

Example 1: The production of components of Al—Mn—Sc based alloys according to the present invention, by AM processing, was simulated using two alloy compositions. The first Al—Mn—Sc based alloy had a composition of Al-4.18Mn-2Mg-0.9Sc-0.18Zr (wt %), while that for the second alloy had a composition of Al-3Mn-1.5Mg-1Sc-0.05Zr (wt %). These alloys were produced by melting master alloys of the compositions Al-60Mn, Al-50Mg, Al-2Sc and Al-10Zr (all wt %) in a resistively heated furnace at 800° C., casting the successive melts and cooling the castings at a solidification cooling rate of approximately of 103 K/s. The cast alloys were cut into 5 mm thick samples and the samples were then ground, using abrasive paper to maintain the same surface roughness.

The samples so produced were placed onto the substrate of a commercial EOSINT M280 SLM machine for laser scanning. A total of 30 laser scans were conducted on the ground sample surface to generate parallel adjacent melt pools without added powder, resulting in a scanned area of approximately 3 mm by 18 mm. The laser scan process was conducted with a laser power of 370 W, a scan speed of 500 mm/s, a spot size of 0.1 mm and a hatch distance of 0.1 mm. After the laser scanning, the samples were aged in a salt bath at 300° C. for various times up to 168 hrs. Samples then were cut using a low speed saw and subsequently mounted to reveal the melt pools on a cross-section for following investigations. Samples for microstructure observations and microhardness testing were prepared according to standard metallography sample preparation methods. The Vickers hardness was measured within the melt pool cross-section area using a Duramin A300 hardness tester with 0.5 Kg load for 10 s. Backscattered electron micrograph (BSE) images of the cross-sectional area were obtained on a JEOL 7001 FEG scanning electron microscope (SEM). The following characteristics were obtained:

a) The maximum hardness achieved for the first alloy Al-4.18Mn-2Mg-0.9Sc-0.18Zr after ageing at 300° C. for 10 hrs was 186.3±2 $HV_{0.5}$; and b) The maximum hardness achieved for the second alloy Al-3Mn-1.5Mg-1Sc-0.05Zr after ageing at 300° C. for 24 hrs was 170.6±2 $HV_{0.5}$.

Example 2: Prism type samples were produced by SLM fabrication, from gas atomised powder with a wt % composition of Al-4.52Mn-1.32Mg-0.79Sc 0.74Zr. The samples were produced on an EOSINT M290 commercial SLM machine, with a laser power of 370 W, scanning speed of 1000 mm/s, hatch distance of 0.1 mm and layer thickness of 30 μm. The samples were built on a 6061 aluminium alloy substrate from which they were removed by electric discharge machining (EDM) cutting. Some of the samples were heat treated in a salt bath at 300±2° C. for 5 hrs and all samples, with and without heat treatment, were then machined into tensile samples of the geometry shown in FIG. 3, according ASTM E8M. Tensile tests were conducted using a 100 kN Instron 5500R/4505 screw driven machine at a constant cross head moving speed of 0.48 mm/min. Resultant tensile engineering stress/strain curves are shown in FIG. 4, while other determined characteristics were:

1) Tensile properties of non-heat treated, as SLM fabricated samples:
   Yield strength=427 MPa, Ultimate tensile strength=453 MPa, Elongation=12.0%
2) Tensile properties of SLM fabricated samples after heat treatment at 300±2° C. for 5 hrs:

Yield strength=577 MPa, Ultimate tensile strength=588 MPa, Elongation=11.3%

GENERAL DESCRIPTION OF THE FIGURES

The performance of the samples of the first and second Al—Mn—Sc based alloys produced in the Example 1 is illustrated in the accompanying FIGS. 1 and 2, while performance in accordance with Example 2 is shown in FIGS. 3 and 4. In the Figures:

FIG. 1 is a BSE image showing hardness indentations in a sample of the second Al—Mn—Sc based alloy;

FIG. 2 provides a plot showing the development of hardness with ageing time for each of the first and second Al—Mn—Sc based alloys;

FIG. 3 is a schematic illustration of tensile sample geometries, in accord with ASTM EBM; and FIG. 4 shows engineering stress/strain curves of non-heat treated samples, as produced by SLM fabrication, and of heat treated samples.

DETAILED DESCRIPTION OF THE FIGURES

FIG. 1 shows the cut surface, of a sample of the second Al—Mn—Sc based alloy, as revealed by metallographic preparation in a backscattered electron micrograph (BSE) image. The lower zone of the image shows the microstructure of the casting of the second alloy, while the upper zone shows the microstructure of the rapidly solidified melt pool produced by remelting of the alloy by laser scanning. As shown, the hardness measurements were taken in the upper, remelted zone. FIG. 1 shows clearly that the upper zone resulting from the laser remelted melt pool is different compared with the initial cast zone, as no white needle or rod shaped primary $Al_6Mn$ or $Al_3Sc$ type precipitates can be observed. This makes clear that manganese and scandium have been successfully trapped within the aluminium matrix after the very fast cooling laser remelting process and a supersaturation status has been achieved.

In FIG. 2, it can be seen that the Al—Mn—Sc based alloy of the invention exhibits very promising results since the hardness values have reached the range of 170-186 $HV_{0.5}$. These properties are similar to high strength 7xxx series alloys, but the thermal stability is much improved as the high hardness levels were maintained even after 168 hours at 300° C. Laser processed aluminium alloys, or even casting alloys, cannot commonly achieve such properties, especially compared with those current widely used aluminium alloys for AM technologies. Normal age hardening Al alloys begin to over-age and soften within some minutes of exposure at 300° C. Also, indications are that the results shown by the Examples of the invention can be further improved by even higher cooling rate and other advantages of the AM process. In summary, the Al—Mn—Sc based alloys of the invention show very promising properties and a high potential for application in a wide range of structural, industrial, engineering, aerospace and transportation components made by the AM process, or by other rapid solidification manufacturing processes.

FIG. 3 shows appropriately produced tensile samples from which the stress/strain curves of FIG. 4 were derived. The yield strength of 427 MPa for the as fabricated (non-heat treated) samples itself is excellent, although the markedly enhanced yield strength of 577 MPa for the heat treated samples highlights the potential for the alloys of the present invention. In contrast, the most favourable yield strength quoted for heat treated SCALMALLOY® is believed to be in the range of 459 to 479 MPa (see www.citim.de/en/metal-additive-manufacturing).

Examples 1 and 2, and the results illustrated by FIGS. 1 to 4, highlight a number of important matters relating to the alloy of the present invention. The alloy benefits from the slow diffusion rates referred to earlier herein for both scandium and manganese, as well as certain other added elements such as zirconium. These slow rates facilitate the ability of the alloy after high cooling rates with thermal cycling to undergo precipitation hardening by precipitation of thermally stable nano-sized precipitates or dispersoids. With manganese this is possible from the lower effective limit of 2.01 wt %, up to the relatively high upper limit of 15.0 wt %, without undesirable precipitate coarsening, such as can tend to occur at levels of manganese addition above 15 wt %.

The alloy also is characterised by enhanced property development achievable on the basis of a simple heat treatment, without a requirement for solution treatment as in the complex heat treatment regimes required for some other precipitation hardenable aluminium alloys. The simple heat treatment, which preferably involves only a single stage operation, effectively doubles as a stress relieving step and precipitation hardening heat treatment. In the case of the use of an AM rapid solidification process, such as one based on SLM, the heat treatment can be conducted before or after a resultant component manufactured by the process is cut from the build platform on which it is built up.

While the alloy of the invention is well suited for use in an AM process such as SLM and other rapid solidification processes, Example 1 and FIGS. 1 and 2 show the suitability of the alloy for use in an alternative rapid solidification process. Specifically, with a component made by a subtractive manufacturing process, such as any of a range of casting processes, the component can be scanned by an energy source such as a laser or electron beam to achieve melting of a scanned region of the surface of the component, with the body of the component then providing a heat sink giving rise to rapid solidification to enhance the properties of the alloy of the scanned surface region. This includes surface treatments such as laser cladding or repair of components using the Al—Mn—Sc based alloy of the invention as part of the component and/or deposited surface materials.

REFERENCES

1. Forbord B, Hallem H, Ryum N, Marthinsen K: "Precipitation and recrystallisation in Al—Mn—Zr with and without Sc", Materials Science and engineering A (2004), 387-389, 936-939.
2. Forbord B, Hallem H, Royset J, Marthinsen K: "Thermal stability of $Al_3(Sc_x,Zr_{1-x})$— dispersoids in extruded aluminium alloys", Materials Science and engineering A (2008), 475, 241-248.
3. Forbord B, Auran L, Lefebvre W, Hallem H, Marthinsen K: "Rapid precipitation of dispersoids during extrusion of an Al-0.91 wt. % Mn-0.13 wt. % Zr-0.17 wt. % Sc-alloy", Materials Science and engineering A (2006), 424, 174-180.
4. Rowe. J, "Advanced materials in automotive engineering" Woodhead Publishing Limited, UK, ISBN 978-1-84569-561-3. Bloeck. M, Chapter 5 "Aluminium sheet for automotive applications", 92-93.
5. Li R D, Wang M B, Yuan T C, Song Bo, Chen C, Zhou K C, Cao P: "Selective laser melting of a novel Sc and Zr modified Al-6.2 Mg alloy: Processing, microstructure, and properties", Powder Technology 319 (2017) 117-128.

6. J. R. Davis, "Alloying: Understanding the Basics". ASM International Publishing, 2001, USA, ISBN978-0-87170-744-4. Chapter 16, "Aluminium and Aluminium alloys", p. 368.

The invention claimed is:

1. An Al—Mn—Sc based powder alloy, wherein the Al—Mn—Sc based powder alloy consists of:
   2.01 wt % to 15.0 wt % manganese,
   0.3 wt % to 2.0 wt % scandium,
   0 wt % up to 6.0 wt % magnesium,
   0 wt % up to 4.0 wt % zirconium,
   optionally at least one other alloying element selected from the group consisting of silicon, zinc, magnesium, copper, nickel, cobalt, silver, chromium, lithium, vanadium, titanium, calcium, tantalum, zirconium, hafnium, yttrium, erbium, and combinations thereof, the at least one other alloying element, if present, is in an amount of less than 4 wt % individually and 15 wt % in total, and
   a balance, apart from incidental impurities, of aluminum.

2. The Al—Mn—Sc based powder alloy of claim 1, wherein the Al—Mn—Sc based powder alloy includes the at least one other alloying element.

3. The Al—Mn—Sc based powder alloy of claim 2, wherein the Al—Mn—Sc based powder alloy contains at least one of magnesium and zirconium at up to the respective limit of 6.0 wt % magnesium and 4.0 wt % zirconium.

4. The Al—Mn—Sc based powder alloy of claim 1, wherein the manganese level is from 2.5 wt % to 8 wt %.

5. The Al—Mn—Sc based powder alloy of claim 4, wherein the manganese level is between 3 wt % and 5 wt %.

6. The Al—Mn—Sc based powder alloy of claim 1, wherein the scandium level is from 0.4 wt % and 1.5 wt %.

7. The Al—Mn—Sc based powder alloy of claim 6, wherein the scandium level is from 0.6 wt % to 1.2 wt %.

8. The Al—Mn—Sc based powder alloy of claim 1, wherein the Al—Mn—Sc based powder alloy is in the form of a grade of powder suitable for use in manufacturing components by an additive manufacturing process.

9. The Al—Mn—Sc based powder alloy of claim 1, wherein the Al—Mn—Sc based powder alloy includes zirconium in an amount of from 0.18 wt % to less than 4 wt %.

10. A method for producing a component of an aluminum based powder alloy, wherein the method uses an additive manufacturing or other rapid solidification process to produce the component of the aluminum based powder alloy by melting and then rapidly solidifying the aluminum based powder alloy, and wherein the aluminum based powder alloy comprises the Al—Mn—Sc based powder alloy of claim 1.

11. The method of claim 10, wherein the Al—Mn—Sc based powder alloy includes the at least one other alloying element.

12. The method of claim 10, wherein the component of the aluminum based powder alloy, after recovery from the additive manufacturing or other rapid solidification process, is subjected to age hardening.

13. The method of claim 10, wherein the cooling rate within the additive manufacturing or other rapid solidification process achieves a supersaturated solid solution for the main elements in order to maintain the properties of the component of the aluminum based powder alloy.

14. The method of claim 13, wherein the cooling rate within the additive manufacturing or other rapid solidification process is in excess of 100 K/s.

15. The method of claim 10, further including a post-heat treatment of the component of the aluminum based powder alloy produced by the additive manufacturing or other rapid solidification process, wherein the post-heat treatment comprises heating the component of the aluminum based powder alloy to a temperature range between 200° C. and 500° C. for an accumulated time of between 0.10 h and 100 h.

16. An Al—Mn—Sc based powder alloy component produced by the method of claim 10.

17. An Al—Mn—Sc based powder alloy component produced by the method of claim 14.

18. An Al—Mn—Sc based powder alloy, wherein the Al—Mn—Sc based alloy consists of:
   2.5 wt % to 8 wt % manganese,
   0.4 wt % and 1.5 wt % scandium,
   0 wt % up to 6.0 wt % magnesium,
   0 wt % up to 4.0 wt % zirconium,
   optionally at least one other alloying element selected from the group consisting of silicon, zinc, magnesium, copper, nickel, cobalt, silver, chromium, lithium, vanadium, titanium, calcium, tantalum, zirconium, hafnium, yttrium, erbium, and combinations thereof, the at least one other alloying element, if present, is in an amount of less than 4 wt % individually and 15 wt % in total, and
   a balance, apart from incidental impurities, of aluminum.

19. The Al—Mn—Sc based powder alloy of claim 18, wherein the Al—Mn—Sc based powder alloy includes zirconium in an amount of from 0.18 wt % to less than 4 wt %.

* * * * *